(12) United States Patent
Burke et al.

(10) Patent No.: US 6,669,072 B2
(45) Date of Patent: Dec. 30, 2003

(54) FLYWHEEL OPERATED NAILER

(75) Inventors: John T. Burke, Williamsburg, OH (US); Shane R. Adams, Lebanon, OH (US); Richard L. Leimbach, Cincinnati, OH (US); Conrad A. Garvis, Mason, OH (US)

(73) Assignee: Senco Products, Inc., Cincinnati, OH (US)

( * ) Notice: Subject to any disclaimer, the term of this patent is extended or adjusted under 35 U.S.C. 154(b) by 158 days.

(21) Appl. No.: 10/027,174

(22) Filed: Dec. 20, 2001

(65) Prior Publication Data

US 2002/0108994 A1 Aug. 15, 2002

Related U.S. Application Data

(60) Provisional application No. 60/258,022, filed on Dec. 22, 2000.

(51) Int. Cl.$^7$ ................................................. B25C 1/06
(52) U.S. Cl. ..................... 227/131; 227/129; 227/134; 173/122; 173/178; 173/205; 192/54.52; 192/144; 192/145
(58) Field of Search ................................. 227/131, 129, 227/134; 173/122, 178, 205; 192/35, 54.52, 55.3, 84.7, 144, 145, 224

(56) References Cited

U.S. PATENT DOCUMENTS

| | | | |
|---|---|---|---|
| 4,042,036 A | 8/1977 | Smith et al. | 173/13 |
| 4,121,745 A | 10/1978 | Smith et al. | 227/8 |
| 4,129,240 A * | 12/1978 | Geist | 227/8 |
| 4,204,622 A | 5/1980 | Smith et al. | 227/7 |
| 4,298,072 A | 11/1981 | Baker et al. | 173/13 |
| 5,320,270 A * | 6/1994 | Crutcher | 227/131 |
| 5,443,196 A * | 8/1995 | Burlington | 227/131 |
| 5,511,715 A | 4/1996 | Crutcher et al. | 227/131 |
| 5,638,933 A * | 6/1997 | Matsumoto et al. | 192/52.5 |
| 6,053,293 A * | 4/2000 | Sato et al. | 192/35 |
| 6,585,094 B2 * | 7/2003 | Okude et al. | 192/35 |

\* cited by examiner

*Primary Examiner*—Rinaldi I. Rada
*Assistant Examiner*—Gloria R Weeks
(74) *Attorney, Agent, or Firm*—Frost Brown Todd LLC (57) ABSTRACT

Disclosed and taught is a novel drive mechanism for a cyclic operating tool employing an energized flywheel to provide the necessary energy to perform a working cycle. The drive mechanism disclosed is particularly useful in hand tool applications such as a hand held nailing machine. The flywheel may be energized by a corded or battery powered motor. The herein disclosed mechanism teaches a novel pair of ball ramp cam plates wherein a first pair of ball ramps cause an initial engagement of a clutch with the energized flywheel whereupon rotation of the clutch causes activation of a second pair of ball ramps which affect compression of a spring which acts to increase the pressure applied to the clutch thereby assuring a slip free engagement between the clutch and he flywheel throughout the working cycle of the drive mechanism. Upon completion of the drive mechanisms working cycle, the second pair of ball ramp cam plates further act to disengage the clutch from the flywheel whereby the flywheel may dissipate the unused kinetic energy remaining within the flywheel as the drive mechanism returns to the start position.

23 Claims, 14 Drawing Sheets

FLYWHEEL OPERATED NAILER

RELATED PATENT APPLICATIONS

This application claims the priority of Provisional Patent Application serial No. 60/258,022, filed on Dec. 22, 2000 and incorporates herein, by reference, the totality of the invention disclosure therein.

This application is related to copending U.S. patent applications titled, "Speed Control For Flywheel Operated Hand Tool" Ser. No. 10/027,768, and "Control Module For Flywheel Operated Hand Tool" Ser. No. 10/027,767, both filed simultaneously with the present application by Shane Adams et al. and are incorporated herein by reference.

BACKGROUND OF THE INVENTION

The herein disclosed and taught invention generally relates to a cyclic operating tool employing an energized flywheel to provide the necessary energy to perform a working cycle.

More specifically the invention disclosed herein relates to, but is not necessarily limited to, a hand held electromechanical fastener driving tool, such as a fastener driving tool having an electrically powered motor energizing a flywheel which provides the necessary kinetic energy to drive a fastener into a work piece. The electrical power may be provided by either a battery or an AC electrical power source.

In the past, where relatively large energy impulses have been required to operate a fastener driving tool, such as an industrial nailer or stapler, it has been a common practice to power such tools pneumatically or by a corded electric motor. Such tools are capable of driving a 3" or longer nail, or staple, into framing wood such as 2×4s, for example.

However, pneumatic driving tools require an on-site air compressor, and corded electric tools require an on-site source of electrical power. Further both type of tools require the user to drag a pneumatic or electrical umbilical behind them during use. Dragging such an umbilical behind becomes particularly troublesome when working in high places such as upon a roof or a ladder.

Electrically driven tools, such as solenoid operated fastener driving tools, are also well known. These are primarily used in lighter duty applications such as in driving one inch brad nails, for example, rather than the larger 1.25 to 2.5, 15 gauge finishing nails and/or heavier framing nails.

Also much effort has been expended in the prior art for providing a heavy duty, high powered, fastener driving tool employing a flywheel as a means to deliver kinetic energy sufficient to power a heavy duty fastener driver. Examples of such systems are disclosed in U.S. Pat. Nos. 4,042,036; 4,121,745; 4,204,622, 4,298,072 and 5,511,715. However, the referenced prior art requires the use of corded electric motors to provide the energy necessary to energize the flywheels.

SUMMARY OF THE INVENTION

The present invention discloses and teaches a novel drive mechanism particularly useful in a cyclic hand tool, which has an operative work cycle followed by a reset cycle such as a powered nailing machine. More particularly the present invention is useful in a cyclic tool employing the kinetic energy of an energized flywheel to provide the necessary energy to perform the tool's operative working cycle.

A drive mechanism is taught whereby a first pair of rotatable caming plates, activated by an electrical solenoid, cause a clutch assembly to engage an energized flywheel. Upon engagement of the flywheel by the clutch a second pair of rotatable caming plates, activated by the flywheel, affect the compression of a spring whereby additional force is imposed upon the clutch ensuring slip free engagement during the following operative work cycle of the drive mechanism. Upon completion of the mechanism's operative work cycle, the second pair of caming plates affect a rapid disengagement of the clutch from the flywheel whereby the drive mechanism returns to its start position and the flywheel dissipates its remaining energy by free wheeling until it stops or until it is re-energized for an additional work cycle.

Although the following embodiment describes the present invention as used in a hand held, battery powered, nailing machine, it is to be understood that the invention may also be used in a corded electric motor embodiment. Further it is to be understood that the present invention is also suitable for applications, other than hand held tools, where a cyclic operation, similar to that of a hand held nailing machine, is desired.

DETAILED DESCRIPTION OF THE PREFERRED EMBODIMENT

Although the following description of the present invention teaches a hand tool powered by a removable battery it is to be understood that the hand tool may also be powered by a corded AC electric motor in place of the battery powered DC motor described herein.

Figure 1:
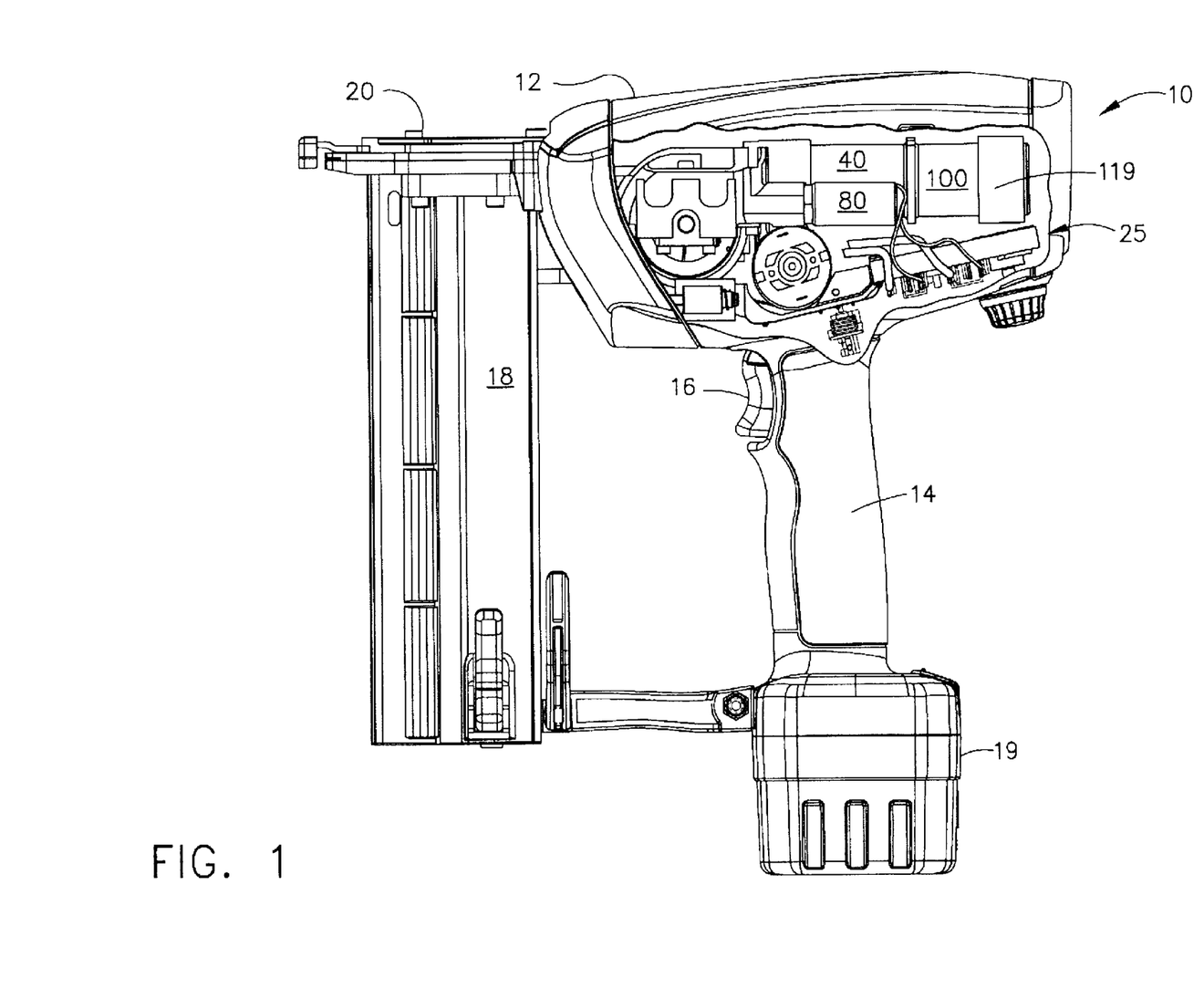
FIG. 1 presents a left side elevational view of a hand held nailing machine, embodying the present invention, having a portion of its left side removed to show the general positioning of the driving mechanism within the tool's outer shell.

FIG. 1 illustrates a hand held nailing machine 10 generally comprising a main body 12 including and a gripping handle 14. Attached to the end of handle 14 is removable, rechargeable battery 19 for providing the necessary electrical energy to operate the nailing machine power drive mechanism. Also included in handle 14 is trigger 16 for operating nailing machine 10. A fastener supplying magazine assembly 18 is typically attached to main body 12 and handle 14, as illustrated, for supplying a strip of fasteners to nose assembly 20.

Figure 2:
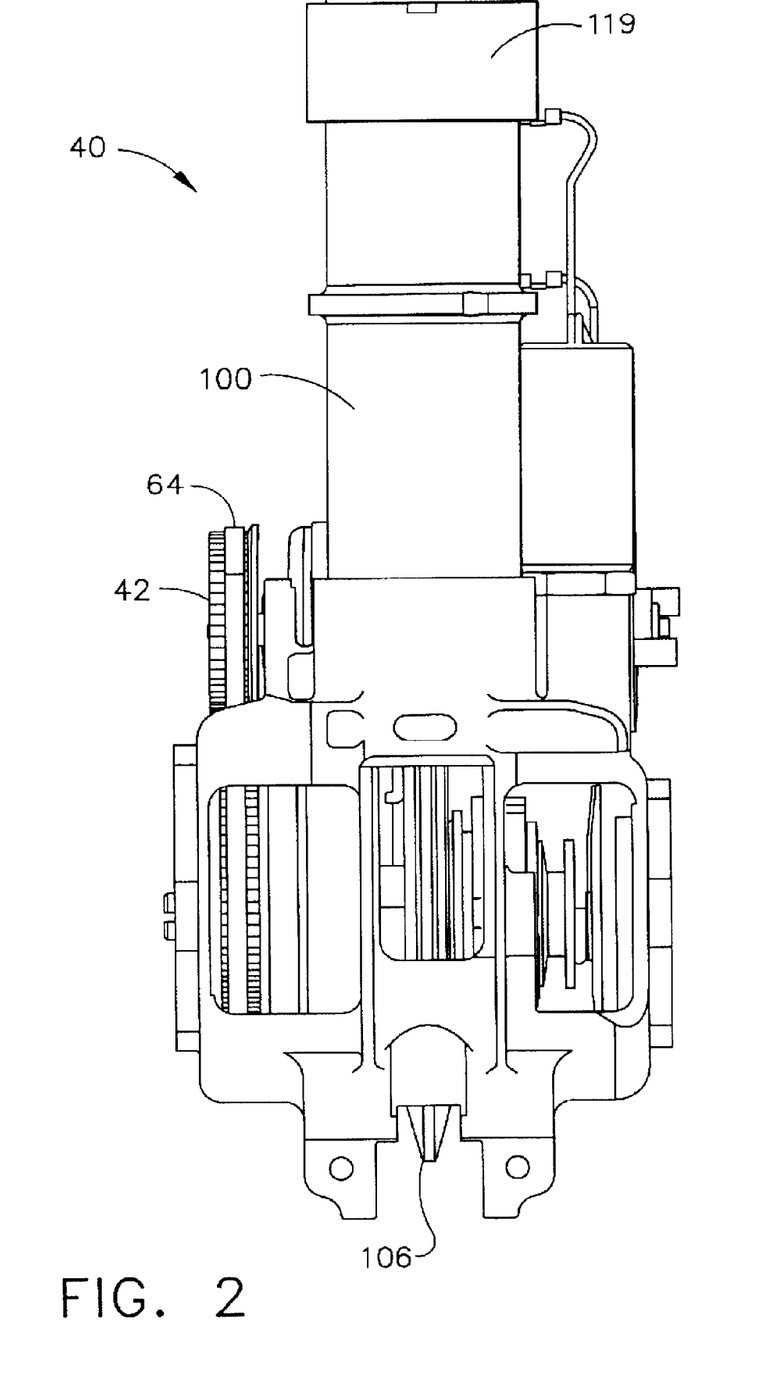
FIG. 2 presents a top view of the fastener drive assembly removed from the main body of the hand held nailing machine as illustrated in figure.
Figure 3:
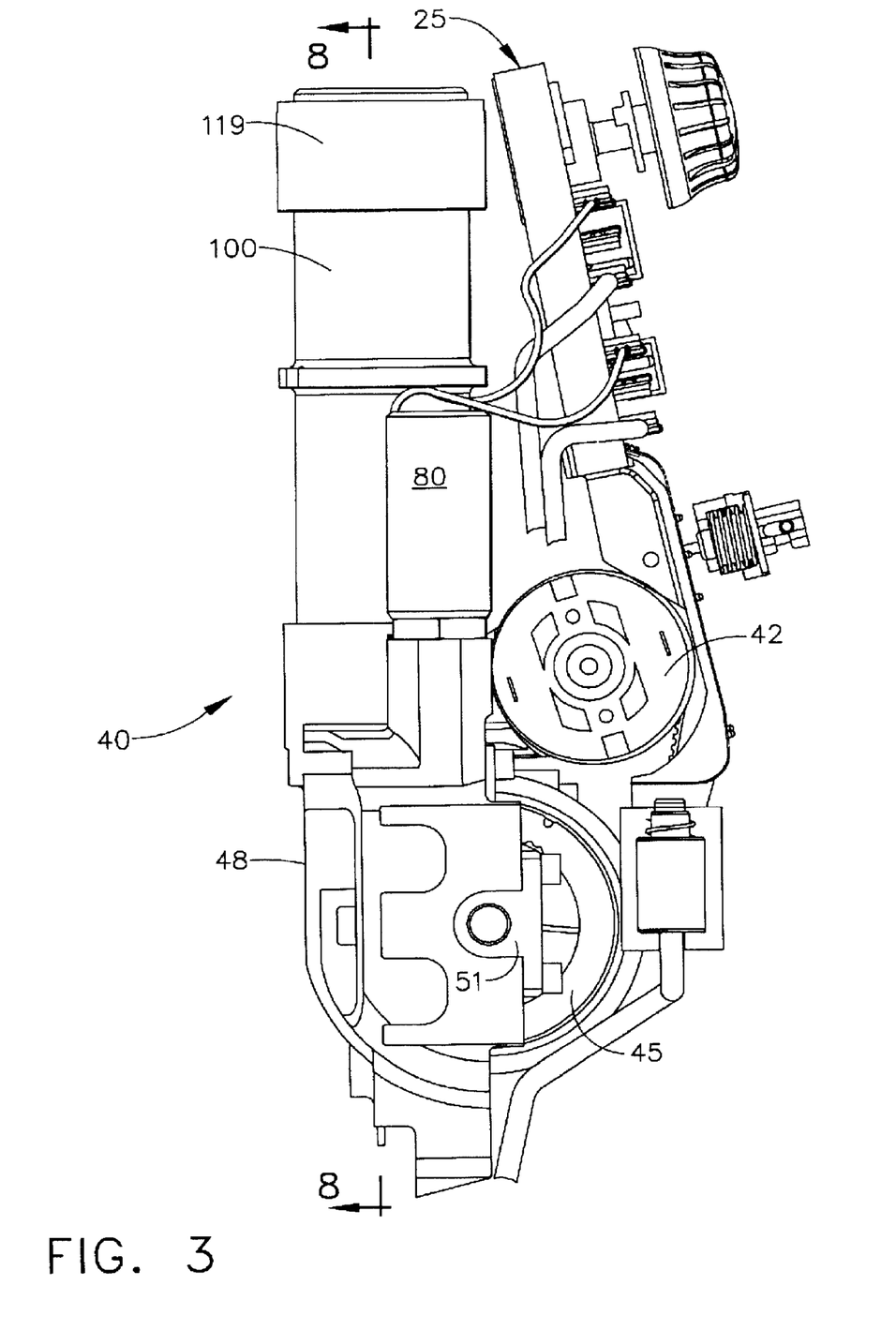
FIG. 3 presents a left side elevational view of the fastener drive assembly as removed from the nailing machine illustrated in FIG. 1.
Figure 4:
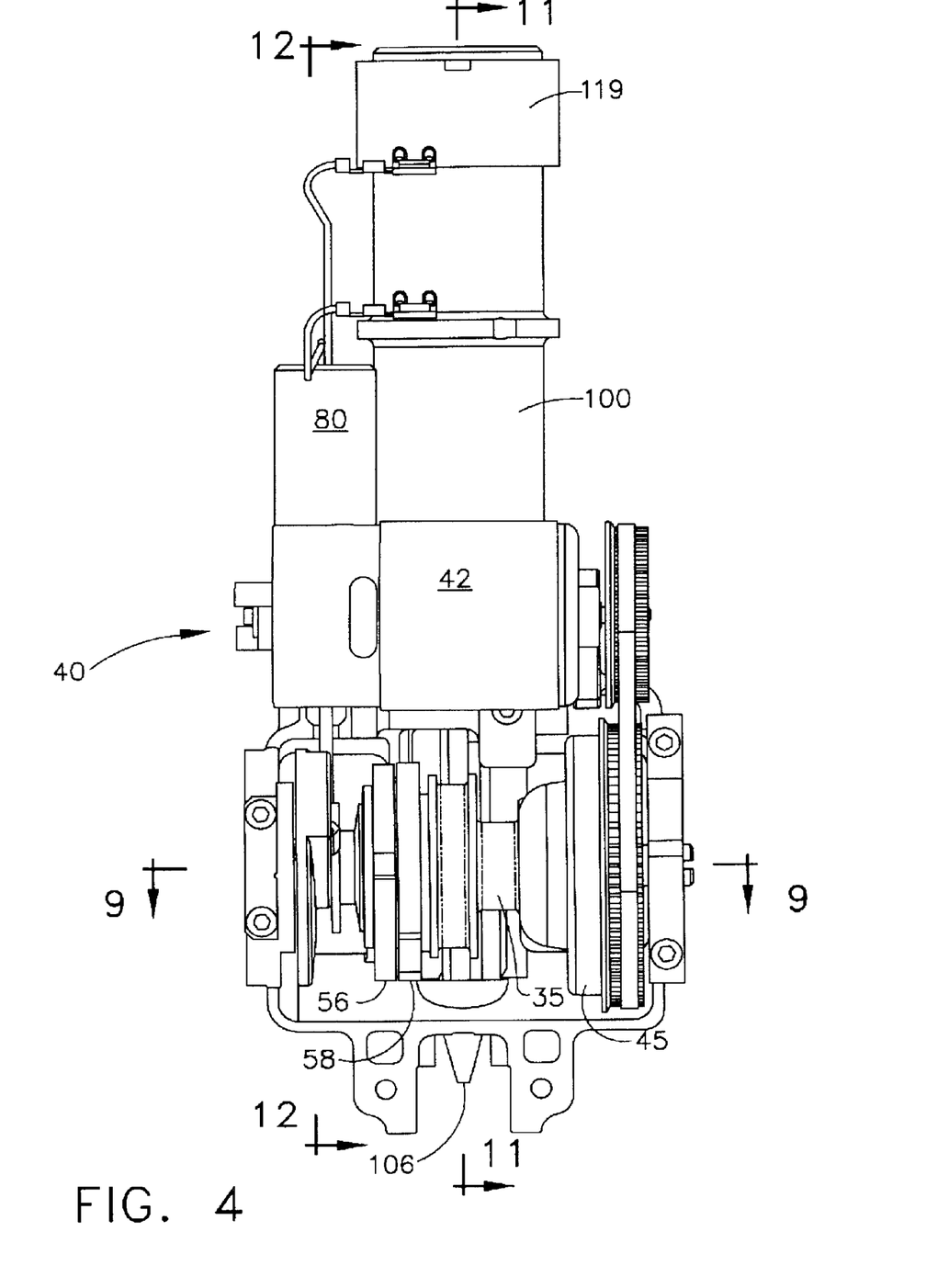
FIG. 4 presents a bottom view, looking upward from the handle of the fastener drive assembly as removed from the nailing machine outer shell illustrated in FIG. 1 and having the electrical control module removed for clarity.
Figure 5:
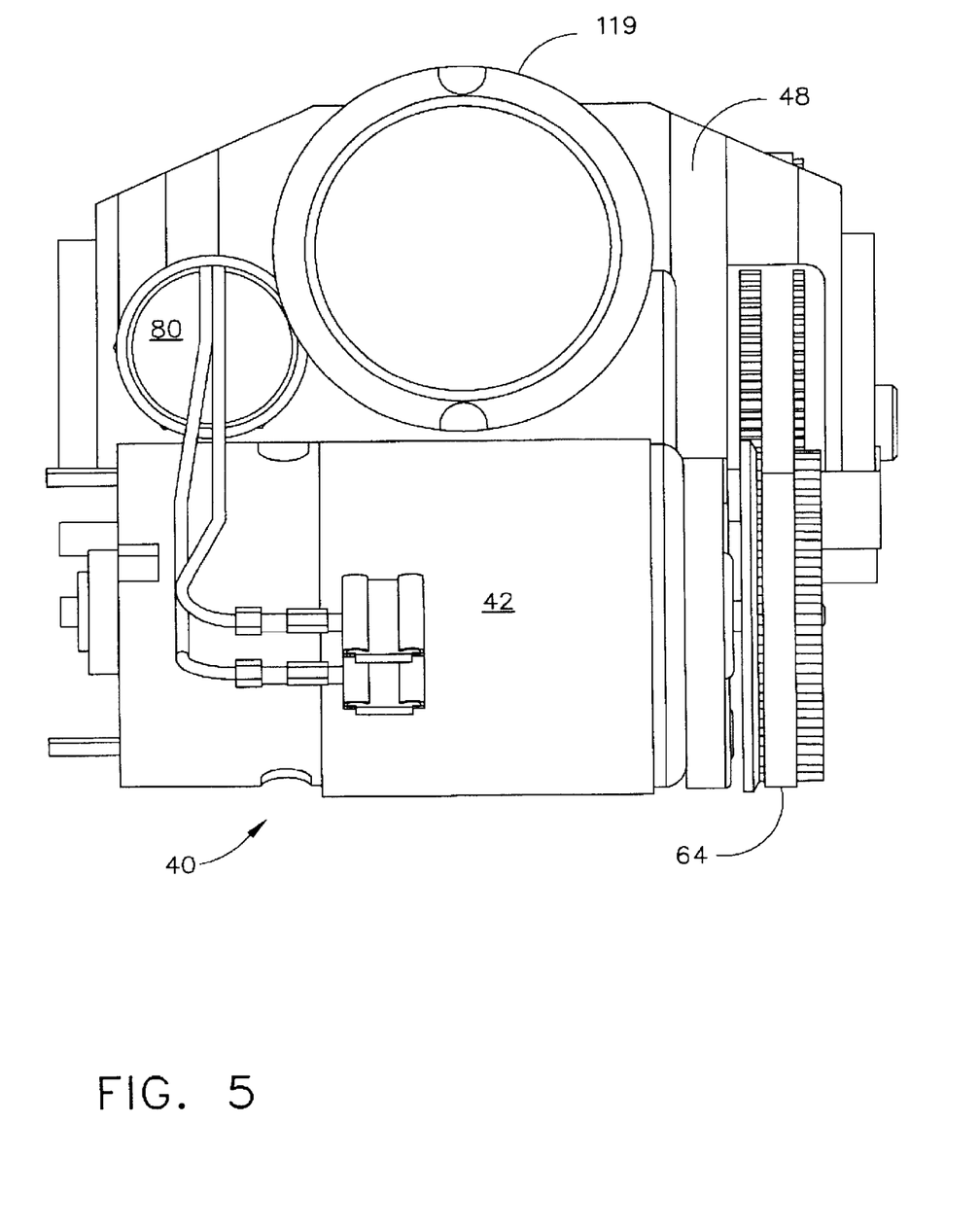
FIG. 5 presents an end elevational view of the fastener drive assembly as removed from the nailing machine illustrated in FIG. 1 and having the electrical control module removed for clarity.

FIGS. 2, 3, 4, and 5 illustrate top, left side, bottom and rear views of fastener drive assembly 40 as positioned within housing 12 of nailing machine 10 illustrated in FIG. 1. FIGS. 2, 4, and 5 have electrical control module 25 removed for clarity. The structural details and operation of control module 25 is completely described within the two copending patent applications identified in the "Related Patent Applications" section above and are incorporated herein by reference.

Figure 6:
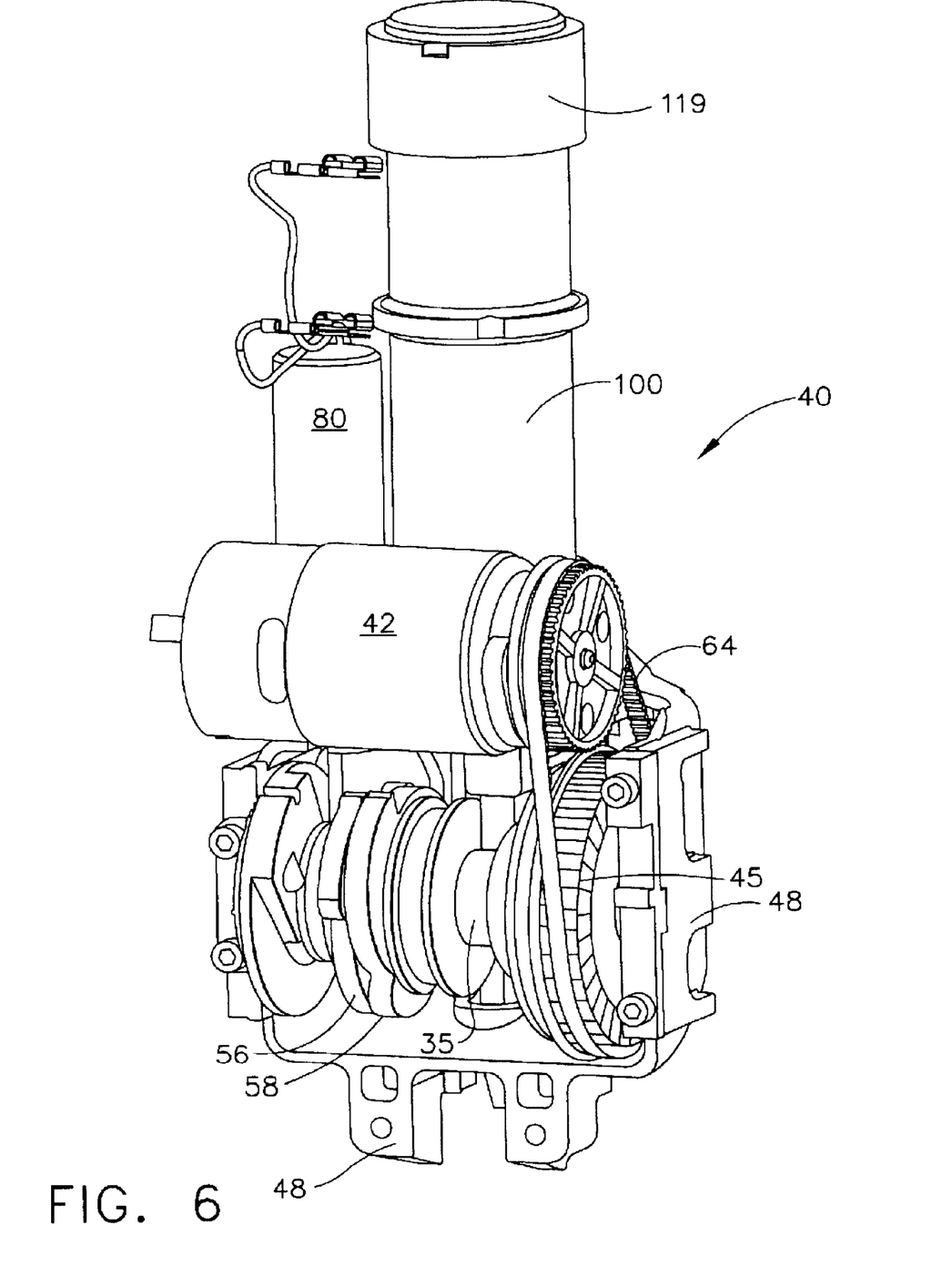
FIG. 6 presents a pictorial view of the fastener drive assembly, having the electrical control module removed for clarity, showing the general arrangement the clutch drive assembly components.

As illustrated in FIG. 6 the primary operational elements of fastener drive assembly 40 comprise a flywheel 45 for providing kinetic energy, for driving a fastener into a work piece, energized by an electric motor 42 by of drive belt 64. Flywheel 45 is free wheeling upon fixed shaft 32. (see FIGS. 7 and 9) Upon achieving the required revolutions per minute (RPM), drive clutch assembly 30 (see FIGS. 7 and 9) causes engagement of clutch assembly 35 and flywheel 45 thereby transferring a portion of the kinetic energy of flywheel 45 to a linearly moving driver 106 for driving a fastener into a work piece.

Figure 8:
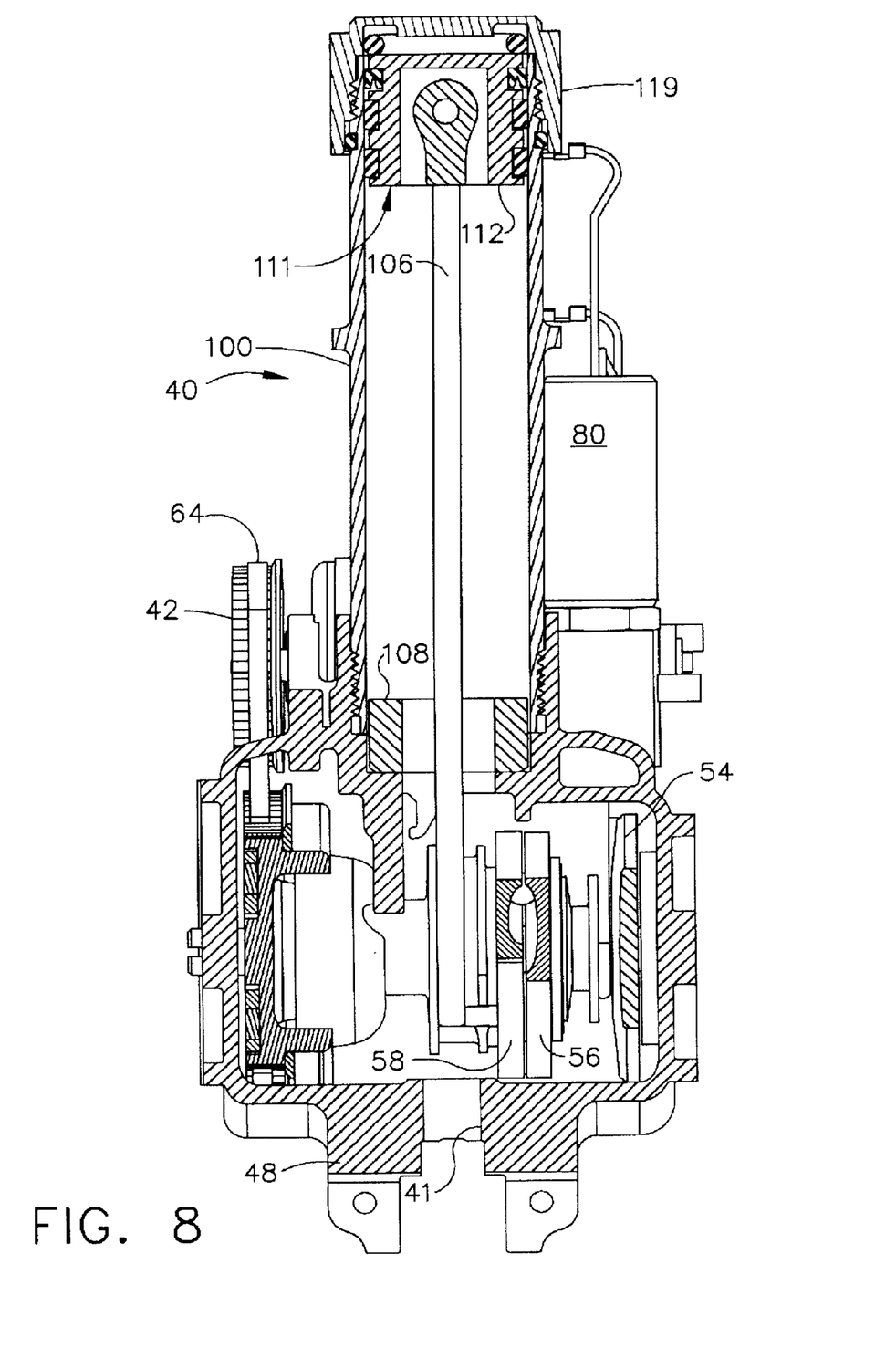
FIG. 8 presents a sectional view taken along line 8—8 in FIG. 3.
Figure 9:
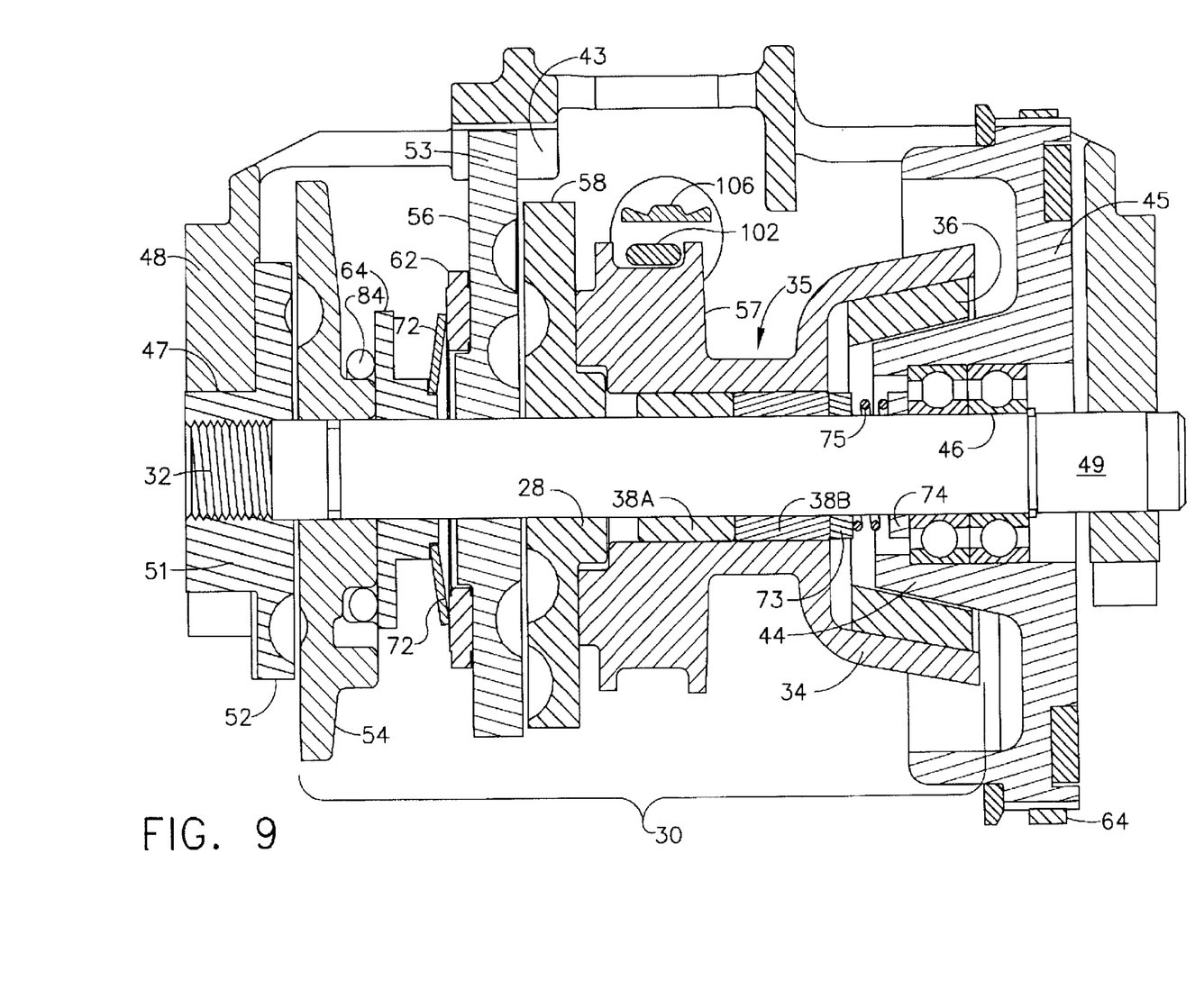
FIG. 9 presents a sectional view taken along line 9—9 in FIG. 4.

Referring now to FIGS. 2, through 9, the elements and operation of the flywheel drive assembly 40 will be discussed. The flywheel drive assembly comprises clutch drive assembly 30 and flywheel 45 gear driven by electric motor 42 by way of belt 64.

Figure 7:
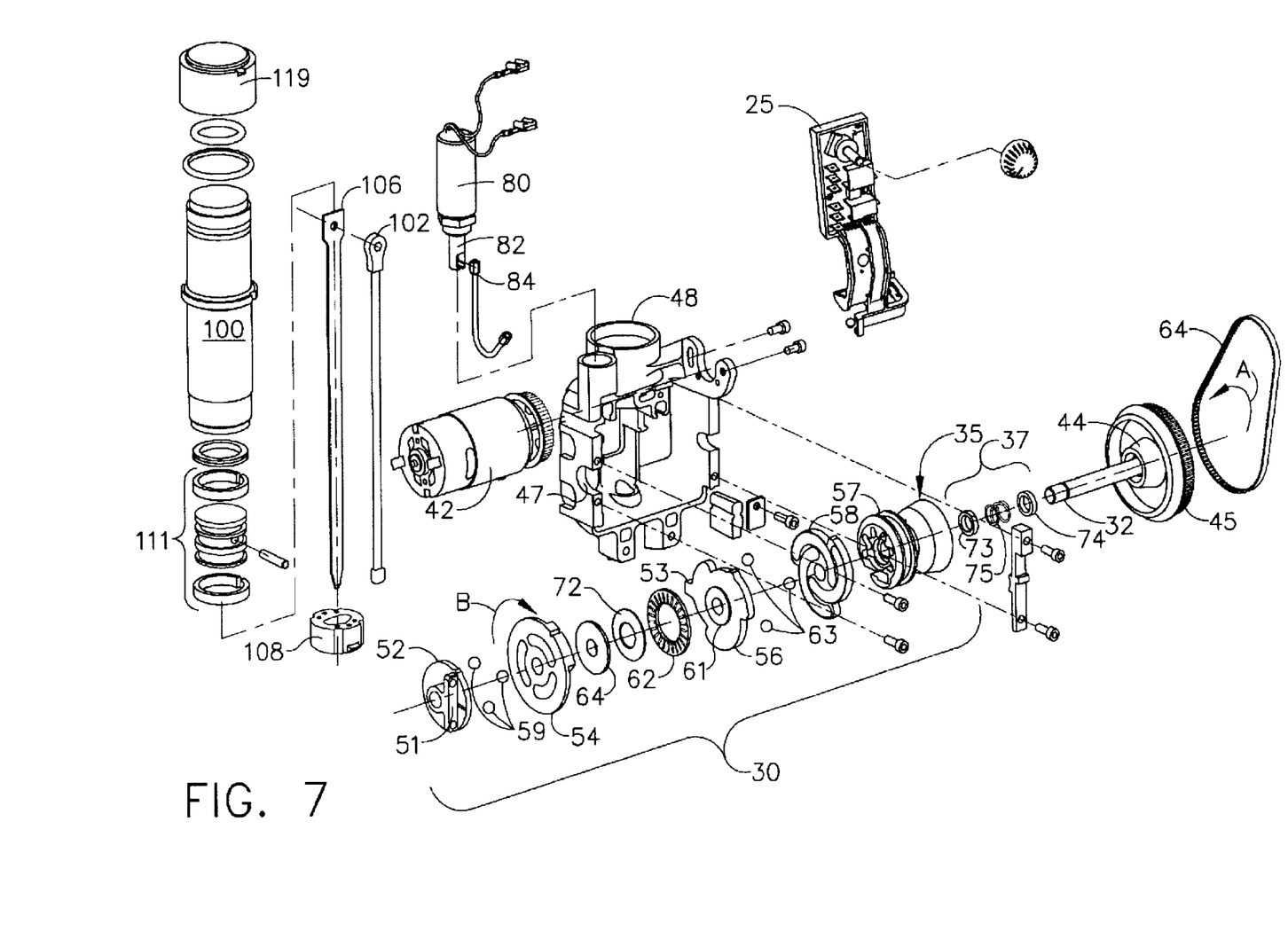
FIG. 7 presents an exploded pictorial view showing the components of the fastener drive assembly illustrated in FIGS. 2 through 6.

Although a belt drive between motor 42 and flywheel 45 is primarily illustrated herein, it is understood that a gear drive may also be used between motor 42 and flywheel 45 or any other suitable drive mechanism Referring particularly to FIG. 9 and additionally to FIGS. 6 through 8 the mechanical structure of flywheel 45 and clutch drive assembly 30 will be operationally described.

Clutch drive assembly 30 and flywheel 45 are axially aligned upon central shaft 32 as best illustrated in FIG. 9. Central shaft 32 is threadingly affixed to end plate 52 which in turn is rigidly attached to frame 48 by an integral boss 51 extending axially from endplate 52 and received within slotted groove 47 such that end plate 52 and central shaft 32 are non-rotatable. The opposite end of central shaft 32 is received within supporting groove 49 in frame 48.

Flywheel 45 is rotatingly positioned at the end of central shaft 32, as best illustrated in FIG. 9, upon deep groove ball bearings 46, whereby flywheel 45 freely rotates about central shaft 32 when energized by motor 42.

Flywheel 45 includes an internal, conical projection 44 for receiving thereon concave, conical friction surface 36 of integral clutch/drum assembly 35. Clutch/drum assembly 35 comprises a bell shaped end 34 having friction surface 36 therein and axially opposite of bell shaped end 34 is a cable winding portion 57 upon which activating cable 102 is wound during the power stroke of tool 10 as is described in further detail below.

Clutch/drum assembly 35 and activation plate 58, although they are separable members, are geared together by interlocking projection 28 whereby clutch/drum assembly 35 and activation plate 58 rotate freely about shaft 32 as a single unitary assembly. Roller bearings 38A and 38B, positioned on the inside diameter of clutch/drum drum 35, are provided to assure the free rotational characteristic of activation plate 58,and clutch\drum 35 as a unitary assembly.

Figure 16:
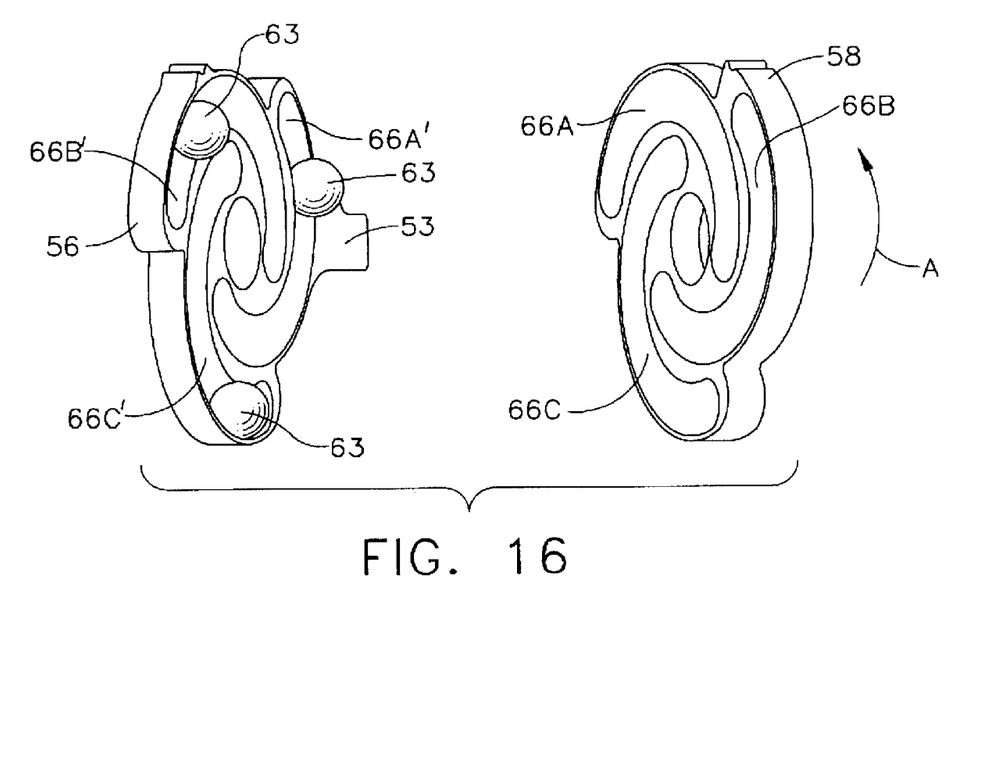
FIG. 16 presents an expanded pictorial view of the activation camming plates.

Adjacent activation plate 58 is fixed plate 56. Fixed plate 56 and activation plate 58 are connected to one another by three equally spaced axially expandable ball ramps 66A, 66B, 66C, 66A', 66B' and 66C' as illustrated in FIG. 16. The operation of the ball ramps 66 between fixed plate 56 and activation plate 58 is described in greater detail below. Fixed plate 56 is fixed to housing 48 such that fixed plate 56 is free to move axially upon central shaft 32, but not free to rotate about shaft 32 by anti-rotation tang 53 slidably received within axially aligned slot 43 within frame 48. See FIG. 9.

Figure 15:
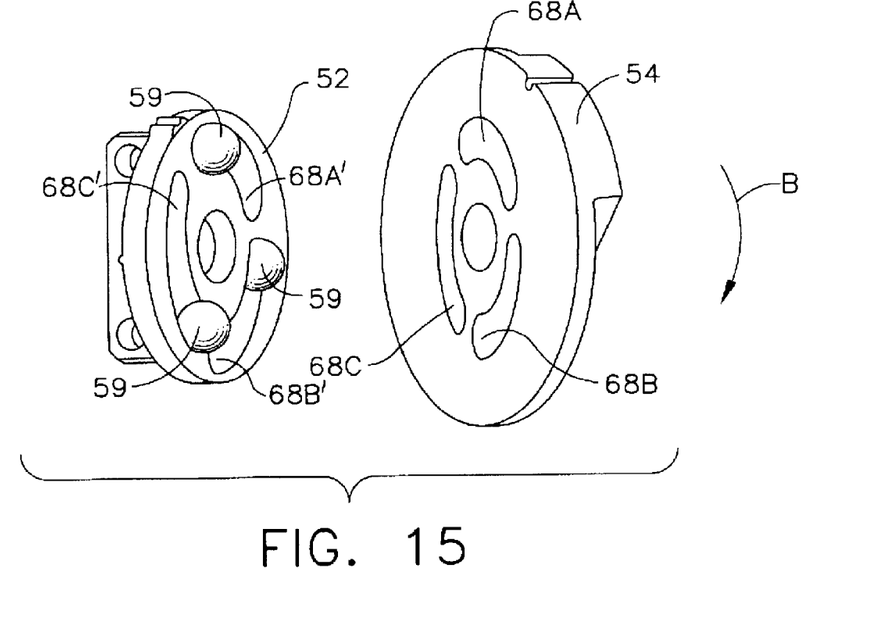
FIG. 15 presents an expanded pictorial view of the solenoid camming plates.

Fixed plate 56 includes circular projection 61 receiving thereon freely rotatable thrust bearing 62 positioned between fixed plate 56 and Belleville spring 72. Belleville spring 72 is positioned, as illustrated in FIG. 9, between spacer 64 and thrust bearing 62 the function of which is described in greater detail below. Axially expandable ball ramps 68A, 68B, 68C, 68A', 68B' and 68C', see FIG. 15, connect end plate 52 and solenoid plate 54 the function of which is also described in greater detail below.

Positioned upon central shaft 32, between clutch/drum 35 and flywheel 45 is compression spring assembly 37 comprising spacers 73 and 74 having coil spring 75 therebetween the function of which is described in further detail below.

Upon start of the fastener work, or driving, cycle, control microprocessor 25 causes motor 42 to "spin up" flywheel 45, in the counter clockwise direction as indicated by arrow A in FIG. 7, to a predetermined RPM. Upon flywheel 45 achieving its desired RPM, or kinetic energy state, control microprocessor 25 activates solenoid 80 which, through a flexible wire cable 84 extending from the solenoid plunger 82 and affixed to the periphery of solenoid plate 54, see FIG. 10, causes solenoid plate 54 to rotate clockwise, as indicated by arrow B in FIG. 7. As solenoid plate 54 rotates clockwise, solenoid plate 54 is caused to move axially away from end plate 52 by action of the corresponding ball ramps 68 in end plate 52 and solenoid plate 54. See FIG. 15. As end plate 52 and solenoid plate 54 axially separate, the remaining elements of clutch drive assembly 30 are thereby caused to move axially toward flywheel 45 compressing coil spring 75 whereby clutch surface 36 preliminarily engages flywheel 45. Engagement of clutch friction surface 36, with flywheel 45, causes counter clockwise rotation of clutch/drum 35 and activation plate 58, as an assembly. By action of corresponding ball ramps 66, between fixed plate 56 and activation plate 58, see FIG. 16, rotation of activation plate 58 causes axial separation of plates 53 and 58. Bellville spring 72 is thus compressed against spacer 64 thereby providing an opposite axial force, forcing clutch/drum 35 into tighter engagement with flywheel 45.

Upon sensing an RPM drop of flywheel 45, the control microprocessor 25 shuts off solenoid 80, whereby solenoid plate 54 begins to return to its reset position by action of the axial force applied by the compressed Belleville spring 72.

As clutch/drum 35 rotates counter clockwise, cable 102 wraps about peripheral groove 57 on clutch/drum 35, thereby drawing piston assembly 111 downward, within cylinder 100, see FIG. 8, in a power, or working, stroke whereby the attached fastener driver 106 is likewise driven downward, through guide block 108 and opening 41 within housing 48, and into nose assembly 20, thereby driving a selected fastener into a targeted workpiece.

Figure 13A:
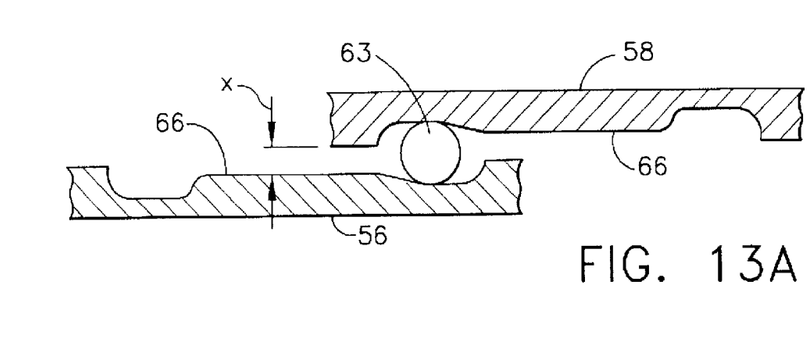
FIGS. 13A through 13C present a schematical presentation of the ball/cam action between the fixed plate an the activation plate.
Figure 13B:
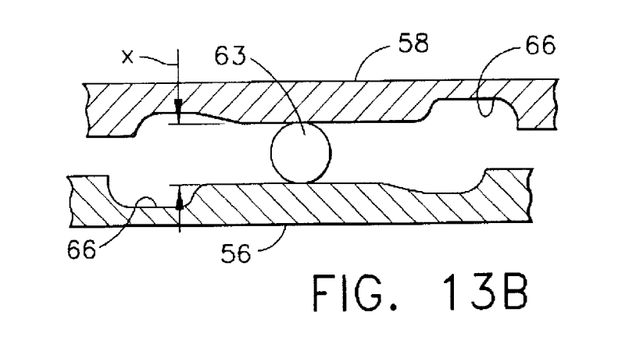
Figure 13C:
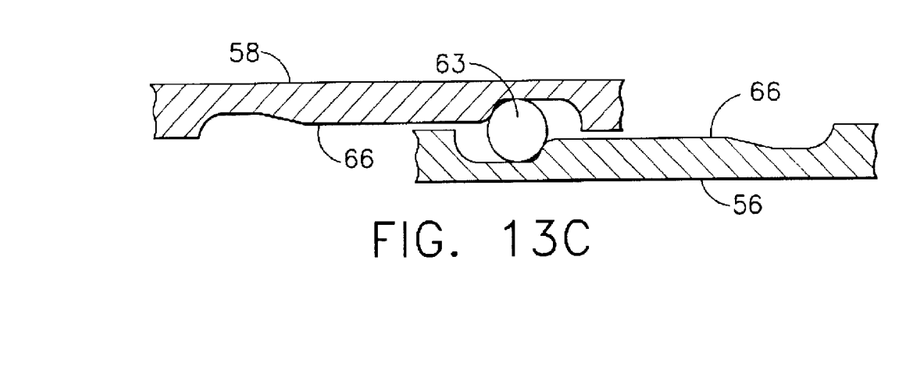

FIGS. 13A through 13C sequentially illustrate the action between fixed plate 56 and activation plate 58 as plate 58 rotates during the power stroke. Although ball ramps 66 of fixed plate 56 and activation plate 58 are helical as illustrated in FIG. 16, ramps 66 are illustrated as being linear in FIGS. 13A through 13C for simplicity of explanation.

FIG. 13A illustrates fixed plate 56 and activation plate 58 at the beginning of the tool's work cycle. As flywheel 45 drives activation plate 58 counter clockwise (to the left in FIG. 13A) balls 63, following ramp profile 66, cause a fast and sudden separation x, between activation plate 58 and fixed plate 56 as illustrated in FIG. 13B. Separation x is maintained throughout the power stroke of driver 106, as illustrated in FIG. 13B, thereby affecting the impartion of the kinetic energy, stored within flywheel 45, to driver 106 as described above. At the end of the power stroke, as illustrated in, plates 56 and 58 suddenly close together thereby causing the rapid disengagement of clutch/drum 35 from flywheel 45.

Figure 14:
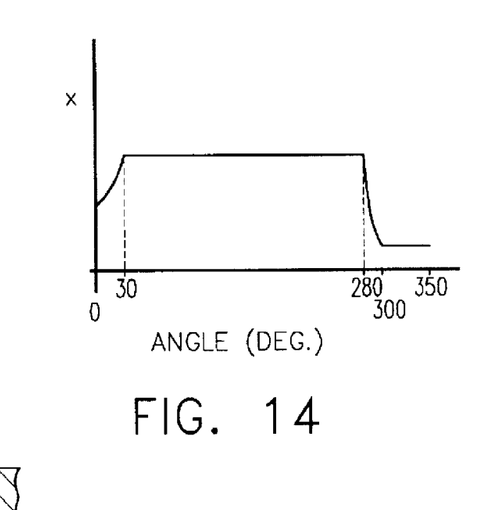
FIG. 14 presents a graph showing the distance x between the fixed plate and the actuation plate as a function of degrees of rotation of the actuation plate.

FIG. 14 presents a representative graphical plot of the separation x between activation plate 58 and fixed plate 56 as a function of the angle of rotation of activation plate 58.

A combination driver guide and resilient stop block 108 is preferably positioned at the bottom of cylinder 110 to stop piston assembly 111, within cylinder 100, at the end of the power stroke.

Upon disengagement of clutch/drum 35 from flywheel 45, coil spring 75 urges all elements of clutch drive assembly 30 back toward end plate 52.

By constructing the clutch drive assembly 30, as taught hereinabove, clutch/drum 35 disengages from flywheel 45 thereby allowing flywheel 45 to continue spinning after drive assembly 30 has reached the end of its power stroke . Thus in the event it is desired to successively drive additional fasteners, the remaining kinetic energy is available for the subsequent operation thereby economizing battery power and saving the drive assembly elements and/or the frame 48 from having to absorb the impact that would otherwise occur by bringing flywheel 45 to a full stop immediately after the power stroke. This feature also permits "dry firing" of the tool.

The clutch drive system as taught herein also provides for automatic compensation for clutch wear in that the expansion between end plate 52 and solenoid plate 54 will continue until clutch/drum 35 engages flywheel 45 thereby allowing solenoid plate 54 to take up the difference at the start of every power drive.

Figure 10:
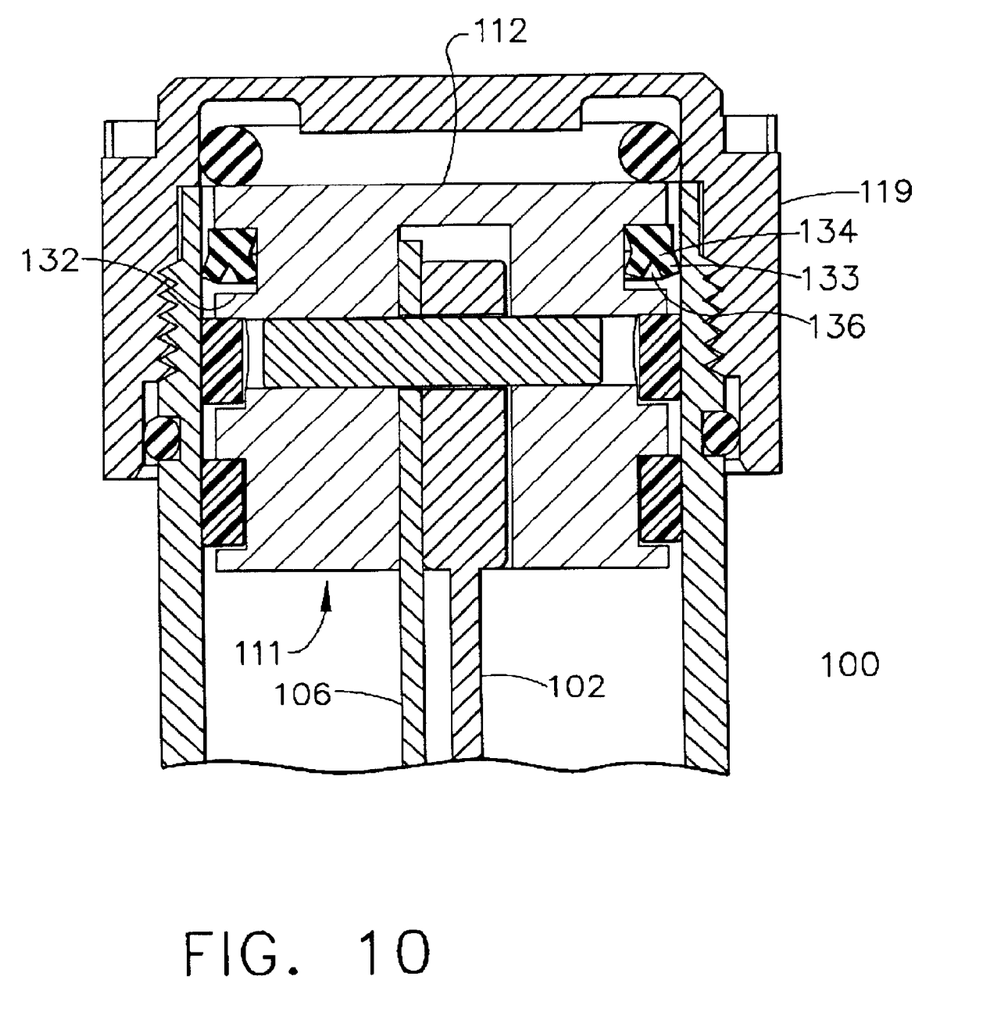
FIG. 10 is a enlarged top section of the cylinder as shown in FIG. 11.
Figure 11:
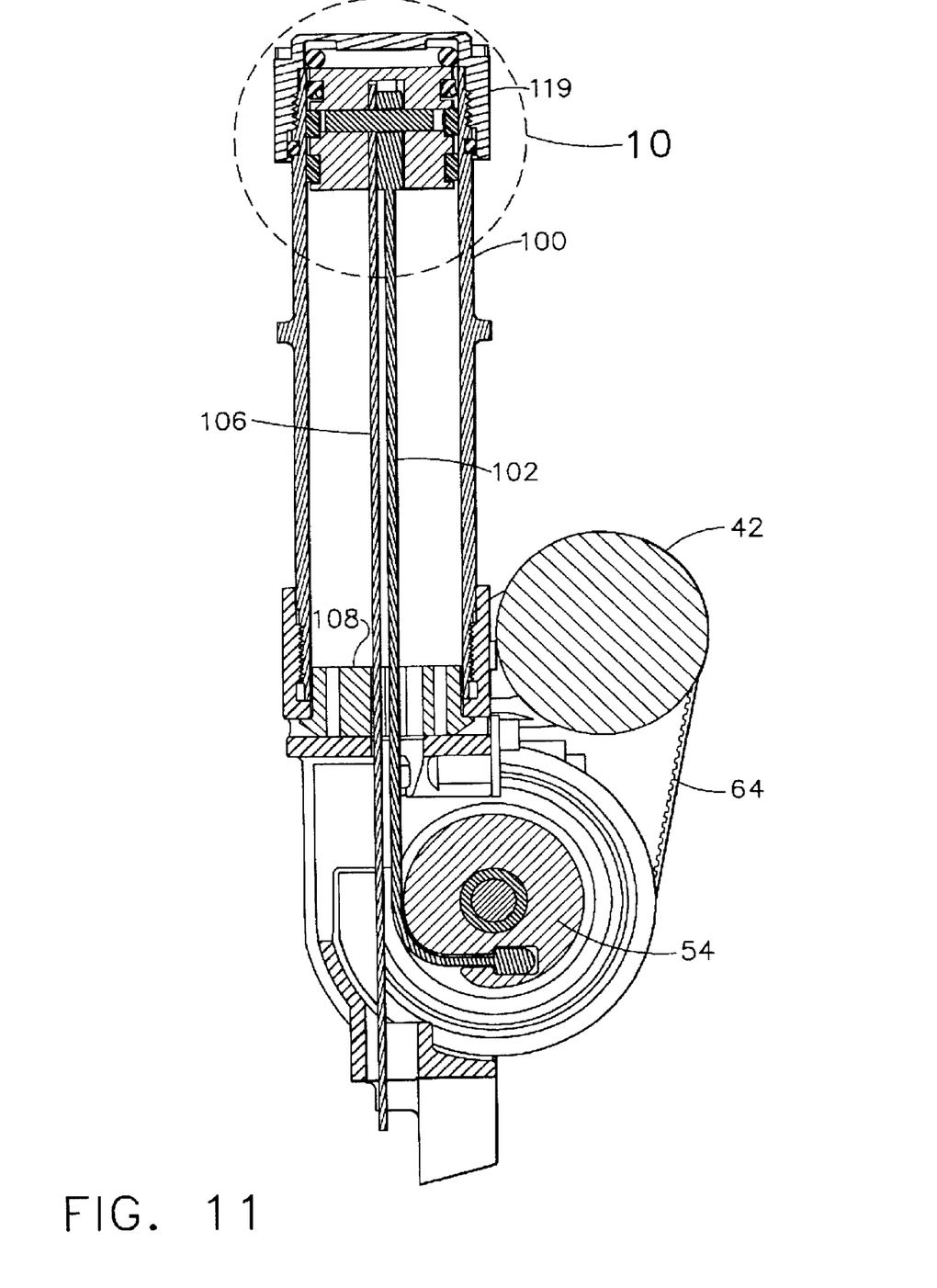
FIG. 11 is a cross-sectional view taken along line 11—11 in FIG. 4.
Figure 12:
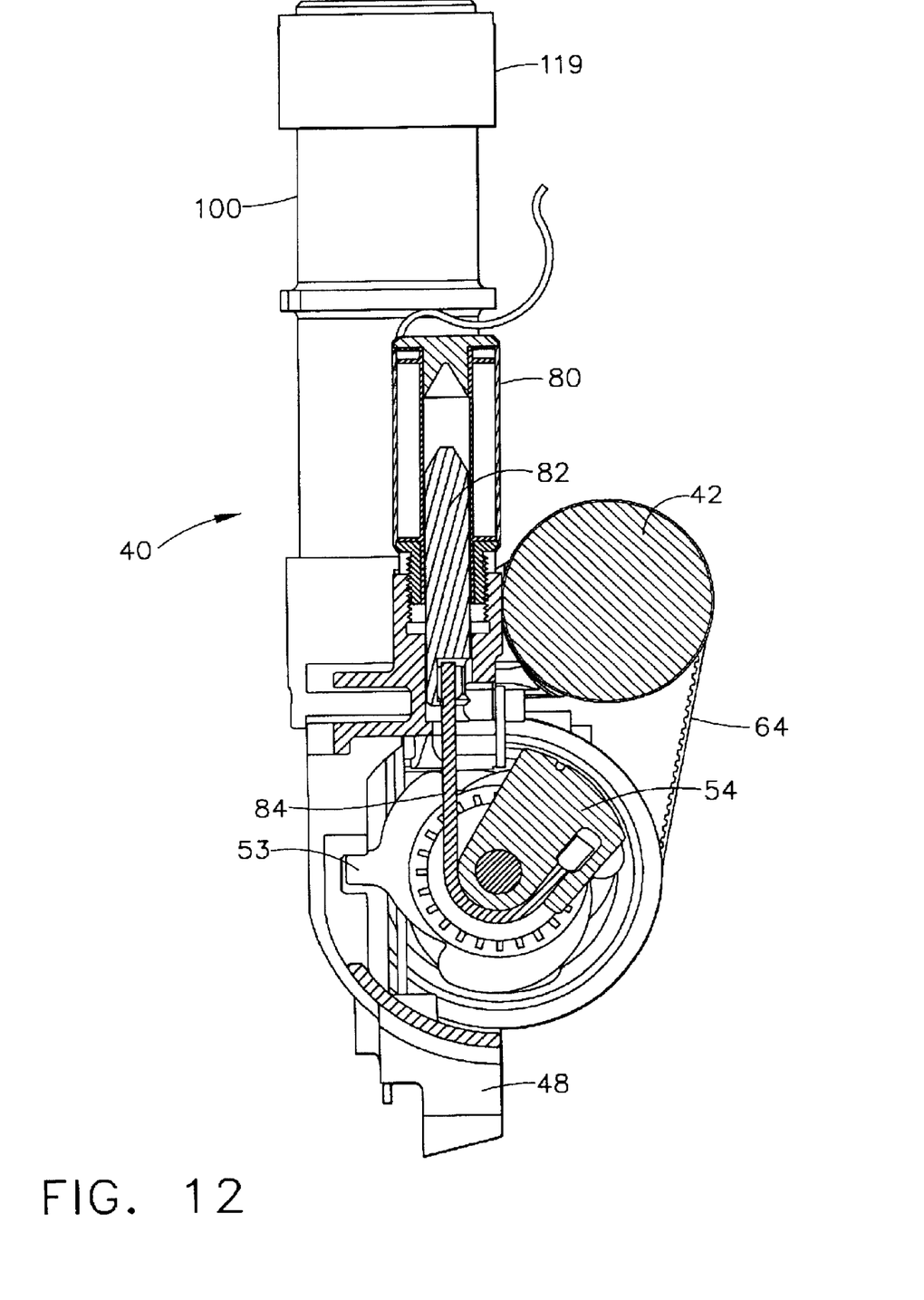
FIG. 12 is a sectional view taken along line 12—12 in FIG. 4.

As illustrated in FIG. 10, piston 112 includes circumferential groove 132 receiving therein a generally rectangular shaped seal 134 having a V shaped groove 136 in one laterally positioned side thereof. One leg 133 of V groove 136 extends laterally outward beyond the outside diameter of piston 112 as illustrated in FIG. 10. Thus seal 134 acts as a check valve such that as piston 112 moves downward, during a power stroke, leg 133 sealing engages the inside wall of cylinder 100 preventing the passage of air past piston 112 thereby creating the desired vacuum above piston 112. In the event a small amount of air does by pass seal 134 and accumulates above piston 112, compression of that accumulation of upon return of piston 112, to its start position at the top of cylinder 100, will cause the air accumulation to flow past seal 134 thereby preventing a compressive air lock above piston 112.

Upon disengagement of drum/clutch 35 from flywheel 45, the vacuum created within the top portion of cylinder 110 draws piston assembly 111 back toward end cap 119 thereby resetting activation plate 58, drum/clutch 35, as an assembly, to their restart position.

As drum 34 returns to its start position tang 33, radially extending from drum 34, engages abutment block 31 affixed to housing 48, see FIG. 6, thereby preventing over travel of drum/clutch 35 as it returns to its start position.

Having shown and described the preferred embodiments of the present invention, further adaptation of the method and structure taught herein may be accomplished by appropriate modifications by one of ordinary skill in the art without departing from the scope of the present invention. Accordingly, the scope of the present invention should be considered in terms of the following claims and is understood not to be limited to the specific structures and methods described in the specification and/or shown in the attached drawings.

We claim:

1. A tool including apparatus for driving a movable work performing member of said tool, said tool comprising:
   a) an outer shell,
   b) a housing within said shell for containing therein the operating mechanism for driving said movable member,
   c) a motor affixed to said housing,
   d) a first end cam plate affixed to said housing,
   e) a central shaft having a first end thereof affixed to said first end cam plate and having its opposite second end supported by said housing,
   f) a second end cam plate rotatably received upon said central shaft,
   g) caming means between said first and second end cam plates whereby rotation of said second cam causes said second end cam plate to axially separate from said first end cam plate,
   h) a first actuation cam plate received upon said central shaft, said first actuation cam plate being axially slidable upon, and non-rotatable about said central shaft,
   i) a second actuation cam plate axially slidable upon and rotatable about said central shaft,
   j) caming means between said first and second actuation cam plates whereby rotation of said second actuation cam plate relative to said first actuation cam plate causes said first and second actuation cam plates to axially separate,
   k) first compressible spring means positioned between said second end cam plate and said first actuation cam plate,
   l) a tool activation drum coupled to said second activation cam plate, said activation drum rotatable and axially slidable upon said central shaft, said activation drum operatively connected to said movable member, such that rotation of said drum drives said tool's work performing member, said drum including an integral clutch, m) a flywheel, drivingly connected to said motor, and rotatable about said central shaft, said flywheel positioned between said drum and said housing, n) second compressible spring means positioned between said flywheel and said drum whereby said flywheel and said drum are axially biased apart from one another, o) means for rotating said second end cam plate whereby axial movement of said second end cam plate away from said first end cam plate causing said drum clutch to axially translate toward and engage said flywheel thereby causing said drum, and said second activation cam plate to rotate, as an assembly, in the direction of said flywheel rotation, thus causing said first and second activation cam plates to axially separate thereby compressing said first compression spring means whereby an additional axial force is imparted to said drum.

2. The tool as claimed in claim 1 wherein said caming means between said first and second end cam plates and between said first and second activation cam plates comprise a circumferentially oriented ball-ramp camming structure.

3. The tool as claimed in claim 2 wherein said first compressible spring means comprises at least one spring.

4. The tool as claimed in claim 3 wherein said means for rotating said second end cam plate includes an electronic solenoid.

5. The tool as claimed in claim 4 wherein said means for rotating said second end cam plate comprises a flexible wire cable wrapped about the periphery of said second end cam plate with its free end attached to the plunger of said electric solenoid whereby activation of said solenoid causes retraction of said plunger thereby causing rotation of said second end cam plate about said central shaft.

6. The tool as claimed in claim 4 including an electronic microprocessor for controlling said motor and said solenoid.

7. The tool as claimed in claim 1 wherein said tool activation drum includes at least one flexible wire cable having a first end affixed to the periphery of said activation drum with the second end of said cable affixed to said movable work performing member whereby rotation of said activation drum, about said central shaft, wraps said cable about said activation drum periphery thereby driving said movable work performing member.

8. The tool as claimed in claim 1 wherein the camming means between said first and second activation plates cause rapid separation of said first and second activation plates to a predetermined distance wherein said distance is maintained throughout the work performing cycle of said work performing member whereupon said first and second activation plates rapidly close toward one another whereby said clutch plate disengages from said flywheel thereby permitting said clutch plate, said activation drum and said second activation plate, as an assembly, to return to its starting position.

9. The tool as claimed in claim 8 wherein said electrical activation of said solenoid is discontinued during the working cycle of said work performing member whereby the axial force between said second end cam plate and said first activation plate cause said second end cam plate to rotate, about said central shaft, to its start position.

10. The tool as claimed in claim 1 wherein said motor is drivingly connected to said flywheel by an endless belt.

11. The tool as claimed in claim 1 wherein said tool is a hand held fastener driving tool.

12. The tool as claimed in claim 11 wherein said tool is a hand held nailing machine.

13. The tool as claimed in claim 1 wherein said motor is battery powered.

14. The tool as claimed in claim 1 wherein said second end cam plate has a mass larger than that of said first end cam plate.

15. The tool as claimed in claim 1 wherein said first compressible spring means is a Belleville spring.

16. A hand held nailing machine comprising:

a) a main body shell including a hand hold handle, b) a nose piece, c) a nail supplying magazine attached to said nose piece and said handle whereby nails are supplied to said nose piece, d) a nail driving member for driving said nails from said nose piece and into a workpiece, e) a housing within said main body shell for containing therein the operating mechanism for operating said nailing machine, f) a motor affixed to said housing, g) a first end cam plate affixed to said housing, h) a central shaft having a first end thereof affixed to said first end cam plate and having its opposite second end supported by said housing, i) a second end cam plate rotatably received upon said central shaft, j) camming means between said first and second end cam plates whereby rotation of said second cam causes said second end cam plate to axially separate from said first end cam plate, said camming means comprising a circumferentially oriented ball-ramp camming structure, k) a first actuation cam plate received upon said central shaft, said first actuation cam plate being axially slidable upon, and non-rotatable about said central shaft, l) a second actuation cam plate axially slidable upon and rotatable about said central shaft, m) camming means between said first and second actuation cam plates whereby rotation of said second actuation cam plate relative to said first actuation cam plate causes said first and second actuation cam plates to axially separate, said camming means comprising a circumferentially oriented ball-ramp camming structure, n) a Belleville spring positioned between said second end cam plate and said first actuation cam plate, o) a machine activation drum coupled to said second activation cam plate, said activation drum rotatable and axially slidable upon said central shaft, said activation drum having a flexible cable having a first end attached to said nail driving member whereby rotation of said activation drum causes said cable to wrap about the periphery of said drum thereby driving said nail driving member into contact with said nail and driving said nail from said nosepiece into said workpiece, p) an axially stationary flywheel, drivingly connected to said motor by an endless belt, and rotatable about said central shaft, said flywheel positioned between said drum and said housing, said drum having an integral clutch axially opposite said second activation plate, q) a coil spring, circumscribing said central shaft positioned between said flywheel and said drum whereby said flywheel and said drum are axially biased apart from one another, r) means for rotating said second end cam plate whereby axial movement of said second end cam plate away from said first end cam plate causes said drum clutch to axially translate toward and engage said flywheel thereby causing said drum, and said second activation cam plate to rotate, as an assembly, in the direction of said flywheel rotation, thus causing said first and second activation cam plates to axially separate thereby compressing said first compression spring means whereby an additional axial force is imparted to said drum, said means for rotating said second end cam plate comprising an electric solenoid having a movable plunger therein, a flexible wire cable wrapped about the periphery of said second end cam plate with its free end attached to said plunger, whereby activation of said solenoid causes retraction of said plunger, into said solenoid, thereby causing rotation of said drum about said central shaft.

17. The nailing machine as claimed in claim 16 wherein said motor is powered by a battery.

18. The nailing machine as claimed in claim 17 wherein said battery is rechargeable.

19. The nailing machine as claimed in claim 18 wherein said rechargeable battery is removable.

20. The nailing machine as claimed in claim 16 including an electronic microprocessor for controlling said motor and said electric solenoid.

21. The machine as claimed in claim 16 wherein the camming means between said first and second activation plates cause rapid separation of said first and second activation plates to a predetermined distance wherein said distance is maintained throughout the work performing cycle of said nail driving member whereupon said first and second activation plates rapidly close toward one another whereby said clutch plate disengages from said flywheel thereby permitting said clutch plate, said activation drum and said second activation plate, as an assembly, to return to its starting position.

22. The tool as claimed in claim 21 wherein said microprocessor discontinues activation of said solenoid during the working cycle of said nail driving member whereby the axial force between said second end cam plate and said first activation plate cause said second end cam plate to rotate, about central shaft, to its start position.

23. The machine as claimed in claim 16 including means for returning said activation drum and said second end cam plate to their start position.

* * * * *